US009798991B2

(12) United States Patent
Kwak (10) Patent No.: US 9,798,991 B2
(45) Date of Patent: Oct. 24, 2017

(54) REVENUE AND PRODUCTIVITY OPTIMIZATION SYSTEM WITH ENVIRONMENTAL SENSOR-CONNECTED SMART BELL

(71) Applicant: TrueLite Trace, Inc., Cupertino, CA (US)

(72) Inventor: Sung Bok Kwak, Cupertino, CA (US)

(73) Assignee: Doojin Technology, Inc., Bucheon-Si (KR)

( * ) Notice: Subject to any disclaimer, the term of this patent is extended or adjusted under 35 U.S.C. 154(b) by 514 days.

(21) Appl. No.: 14/550,991

(22) Filed: Nov. 22, 2014

(65) Prior Publication Data
US 2016/0148141 A1  May 26, 2016

(51) Int. Cl.
G06Q 50/12 (2012.01)
G06Q 10/06 (2012.01)
G06Q 10/04 (2012.01)

(52) U.S. Cl.
CPC ....... G06Q 10/06315 (2013.01); G06Q 10/04 (2013.01); G06Q 10/063 (2013.01); G06Q 50/12 (2013.01)

(58) Field of Classification Search
CPC ...... G06Q 10/04; G06Q 10/06–10/067; G06Q 50/10–50/12
See application file for complete search history.

(56) References Cited

U.S. PATENT DOCUMENTS

| 6,366,196 B1* | 4/2002 | Green | G06Q 50/12 340/10.6 |
|---|---|---|---|
| 2004/0227617 A1* | 11/2004 | Vasquez | G06Q 10/02 340/7.2 |
| 2005/0046547 A1* | 3/2005 | Gagnon | G06Q 30/02 340/286.09 |
| 2005/0046548 A1* | 3/2005 | Foster | G06Q 30/02 340/286.09 |
| 2007/0191000 A1 | 8/2007 | Veni et al. | |
| 2008/0147461 A1* | 6/2008 | Lee | G01C 21/206 705/7.34 |

(Continued)

*Primary Examiner* — David Lazaro
*Assistant Examiner* — Julian Chang
(74) *Attorney, Agent, or Firm* — Invent Capture, LLC.; Samuel S. Cho

(57) ABSTRACT

A revenue and productivity optimization system includes a service request device, also called a "smart bell," an environmental sensor near or incased in the service request device, a service request reception device, and a cloud-computing server operating software components for the revenue and productivity optimization system. In one embodiment, one or more environmental variables, such as ambient temperature, humidity, noise levels, brightness, and ambient gas compositions, are measured by one or more environmental sensors, and relevant sensor data are transmitted to the cloud-computing server. The revenue and productivity optimization system correlates the sensor data to bell button press frequencies and intervals from the service request device, and analyzes and determines an optimal threshold or range for those environmental variables for higher revenue and/or productivity of an organization. The revenue and productivity optimization system then creates and transmits recommended actions to a supervising entity of the organization.

10 Claims, 6 Drawing Sheets

Revenue and Productivity Optimization Case 1

Revenue and Productivity Optimization Case 2

Examples of Revenue and Productivity Optimization Analysis Performed by the Revenue and Productivity Optimization System with Environmental Sensor-Connected Smart Bell (56) References Cited

U.S. PATENT DOCUMENTS

| | | | | |
|---|---|---|---|---|
| 2008/0249837 A1* | 10/2008 | Angell | ............ | G06Q 10/06375 705/7.33 |
| 2008/0284573 A1* | 11/2008 | Stambaugh | ............ | H04L 12/66 340/286.02 |
| 2009/0137207 A1* | 5/2009 | Peng | ............ | H04B 5/02 455/41.3 |
| 2012/0095608 A1* | 4/2012 | Murakami | ............ | G06Q 10/04 700/291 |
| 2013/0030861 A1* | 1/2013 | Umamaheswaran | .. | G06Q 10/06 705/7.28 |
| 2015/0006263 A1* | 1/2015 | Heier | ............ | G06Q 10/06398 705/7.42 |
| 2015/0193716 A1* | 7/2015 | Tanigawa | ............ | H05B 37/029 705/7.39 |
| 2016/0148229 A1* | 5/2016 | Root | ............ | G06Q 10/06 705/7.31 |
| 2017/0116625 A1* | 4/2017 | Martin | ............ | G06Q 30/0202 |

\* cited by examiner

A System Block Diagram for a Revenue and Productivity Optimization System
With Environmental Sensor-Connected Smart Bell

FIG. 1

Another System Block Diagram for a Revenue and Productivity Optimization System With Environmental Sensor-Connected Smart Bell

Software Component Block Diagram for a Revenue and Productivity Optimization System with Environmental Sensor-Connected Smart Bell A System Block Diagram of a Cloud-Computing Server Operating a Revenue and Productivity Optimization System with Environmental Sensor-Connected Smart Bell

Revenue and Productivity Optimization Case 1

Revenue and Productivity Optimization Case 2

Examples of Revenue and Productivity Optimization Analysis Performed by the Revenue and Productivity Optimization System with Environmental Sensor-Connected Smart Bell

FIG. 6

REVENUE AND PRODUCTIVITY OPTIMIZATION SYSTEM WITH ENVIRONMENTAL SENSOR-CONNECTED SMART BELL

BACKGROUND OF THE INVENTION

The present invention generally relates to service request devices and service request reception devices. The present invention also relates to a revenue and productivity optimization system that utilizes an environmental sensor with a service request device to generate computerized revenue and productivity optimization recommendations to a supervising entity. In addition, the present invention also relates to utilizing a service request device to prompt a response from a service performer wearing, holding, or watching a service request reception device. Furthermore, the present invention also relates to improving operational efficiency of an organization by intelligently analyzing environmental sensor and service request device feedback, and then recommending specific actions that may increase revenue or productivity of the organization.

Service-oriented and in-person business operations often deploy service request devices to enable a customer to gain attention from a service performer. For example, a classical and conventional form of a service request device is a physical bell placed on a table in a restaurant, on a hotel check-in counter, or on a front counter of a store. When a customer rings the physical bell, the sound of the physical bell alerts a service performer, such as a restaurant worker, a hotel staff member, or a store clerk, to be physically present in front of the customer to fulfill a service request.

In recent years, electronic service request devices (e.g. electronic service request bells, one-way or two-way pagers, and etc.) are widely deployed in business operations to prompt a service performer via a service request reception device that a service is being requested at a particular location. These electronic service request devices can be utilized in restaurants, hotels, stores, or even in assembly lines in a factory. In many cases, an electronic service request device has a unique device identification number or code that is correlated to a table number, a counter number, an assembly line location number, or another location-identifying information easily understood by a service performer. In case of industrial and manufacturing operations usage of the electronic service request devices, a factory worker can press a bell button from a service request device to prompt attention from a supervisor or a support staff, if there is a problem or an issue in an assembly-line operation. Alternatively, the electronic service request device can be utilized to indicate a completion of an assembly or a request for supply of materials in the assembly-line operation.

By analyzing a service requester's bell pressing frequencies and time intervals between each bell press on a service request device, an electronic system that collects and analyzes user interaction data associated with the service request device may be able to provide revenue and productivity optimization suggestions to a business, a manufacturing facility, or another organization. Therefore, it may be advantageous to provide a novel electronic system that generates computerized suggestions and recommendations for potential increases in revenue and/or productivity, based on the analysis of the user interaction data associated with the service request device. Furthermore, it may also be advantageous to provide a novel electronic system that correlates the service request device's user interaction data with certain environmental variables, such as temperature, humidity, ambient noise levels, brightness, and ambient gas levels near or inside the service request device, in order to generate incisive and detailed computerized suggestions and recommendations for revenue and/or productivity increases to an organization.

Moreover, it may also be advantageous to devise a novel electronic system that identifies and determines a poorly-behaving service performer that exhibits chronically-problematic responses to service requests by customers or other individuals. In addition, it may also be advantageous to devise this novel electronic system to report the identified, poorly-behaving service performer to a supervising entity or to an operational quality control staff.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a revenue and productivity optimization system is disclosed. This system comprises: a service request device with a bell button that generates service request data and prompts a service performer to approach the service request device when the bell button is pressed, wherein the service request device is connected to a service request data and sensor data transceiver unit for transmission of the service request data and sensor data to a computer server; an environmental sensor that measures ambient temperature, humidity, noise levels, brightness, or ambient gas compositions near the service request device and generate the sensor data, wherein the environmental sensor is connected to or incorporated in the service request device; a service request reception device that alerts the service performer when the bell button is pressed from the service request device; the computer server with a CPU and a memory unit connected to the service request data and sensor data transceiver unit, which is connected to the service request device and the service request reception device; a first set of relational data that tracks time elapsed between a first service request bell press from the service request device and a confirmatory signal of successful service fulfillment from the service request reception device; a second set of relational data that tracks a number of repeated service request bell presses, a time interval between each of the repeated service request bell presses from the service request device, and the confirmatory signal of successful service fulfillment from the service request reception device; a revenue and productivity optimization analysis module executed on the CPU and the memory unit of the computer server, wherein the revenue and productivity optimization analysis module determines an optimal range or threshold for an environmental variable for increasing sales revenue or productivity of an organization by correlating the sensor data from the environmental sensor with the first set of relational data and the second set of relational data; a revenue and productivity optimization recommendation module executed on the CPU and the memory unit of the computer server, wherein the revenue and productivity optimization recommendation module generates computerized recommendations of the optimal range or threshold for the environmental variable based on outputs from the revenue and productivity optimization analysis module; and an optimization recommendation and alert communication module executed on the CPU and the memory unit of the computer server, wherein the optimization recommendation and alert communication module transmits the computerized recommendations of the optimal range or threshold for the environmental variable to a supervising entity.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more revenue and productivity optimization systems with environmental sensor-connected smart bells. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "environmental sensor" is defined as a sensing apparatus that can detect one or more conditions near a current location of the sensing apparatus. An environmental sensor may detect temperature, humidity levels, ambient noise levels, brightness levels, or ambient gas concentrations in the air. Therefore, a thermometer, a humidity sensor, a microphone, a photo intensity sensor, and a gas sensor (e.g. oxygen, carbon monoxide, carbon dioxide, and etc.) are examples of environmental sensors.

Furthermore, for the purpose of describing the invention, a term "revenue and productivity optimization" is defined as an attempt to increase sales, margins, and/or efficiency of an organization, a manufacturing facility, or another business endeavor. In a preferred embodiment of the invention, a revenue and productivity optimization system incorporates one or more environmental sensors and a service request device (e.g. a "smart" bell), in order to determine correlations among sensor-detected environmental variables, revenue, and productivity, and also to generate computerized recommendations to improve an organization's revenue and/or productivity.

In addition, for the purpose of describing the invention, a term "chronically-problematic response" is defined as a persistent pattern of ignored responses and/or delayed responses to a service request received by a service performer's service request reception device. In one example, the persistent pattern may comprise a combination of ignored responses and/or delayed responses that substantially exceed an average number of ignored responses and/or delayed responses by other service performers of a business operation for a particular period of time (e.g. per daily cycle, per weekly cycle, per monthly cycle, and etc.). In one example, if an electronic alert system determines that a particular service performer has exhibited the persistent pattern of ignored responses or delayed responses, that particular service performer can be flagged by the electronic alert system, and a "chronically-problematic response" alert can be transmitted to a supervising entity or an operational quality control staff member.

Furthermore, for the purpose of describing the invention, a term "service" is defined as a task, a work order, a product order, or another favor that a service performer can conduct or complete for a service requester.

In addition, for the purpose of describing the invention, a term "response" is defined as an act of physical summon to a service requester's location, or an electronic reply to a service request transmitted from a service request device operated by the service requester.

Moreover, for the purpose of describing the invention, a term "fulfillment" is defined as satisfactorily completing a service (e.g. a task, a work order, a product order, or another favor) requested by a service requester. In one embodiment of the invention, the term "fulfillment" may be construed as identical as the term "response," meaning that it is an act of physical summon to a service requester's location, or an electronic reply to a service request transmitted from a service request device operated by the service requester In another embodiment of the invention, the term "fulfillment" may be construed distinctly from the term "response," due to the degree of completeness of a particular service. In this alternate embodiment of the invention, the term "fulfillment" may imply that a service requested by a service requester is satisfactorily completed, as opposed to a mere initial response to the service requester.

Furthermore, for the purpose of describing the invention, a term "service performer" is defined as a person who is assigned by a business operation to provide a specific service to a service requester, who is typically a customer or a client of the business operation. In some cases, a service performer and a service requester may be colleagues in the same business operation, wherein the service performer provides troubleshooting support or other business-related support to the service requester. In some other cases, a service performer and a service requester may have a contractor-client relationship.

In addition, for the purpose of describing the invention, a term "service requester" is defined as a customer, a client, or a colleague who utilizes an electronic form of a "service request device" to make a service request to a service performer. In one example, a service requester is a customer in a restaurant who presses a bell button on a service request device to summon a waitress (i.e. a service performer), and subsequently order an additional drink from the restaurant's menu. In another example, a service requester is a hotel guest who presses a bell button on a service request device to summon a hotel staff member (i.e. a "service performer), and subsequently make a service request to clean his or her guest room. Yet in another example, a service requester is a factory worker who presses a bell button on a service request device to summon a repair technician (i.e. a "service performer) to repair or replace a broken toolset.

Moreover, for the purpose of describing the invention, a term "service request device," which is also interchangeably described herein as a "smart bell," is defined as an electronic device that is configured to make an electronic service request to another electronic device used by a service performer. Examples of a service request device include, but are not limited to, an electronic service request bell, an electronic one-way or two-way pager, or another service request-capable electronic device.

Furthermore, for the purpose of describing the invention, a term "service request reception device" is defined as an electronic device that is configured to receive an electronic service request from a service request device. In one example, a service request reception device may be a watch-style electronic device worn by a service performer, wherein a display panel in the watch-style electronic device shows identifying information and/or location information of a service request device or a service requester. In another example, a service request reception device may be a larger standalone display panel configured to show identifying information and/or location information of a service request device or a service requester. Yet in another example, a service request reception device may be a mobile phone or another portable electronic device that executes a paging application to receive incoming service requests associated with a service requester.

One aspect of an embodiment of the present invention is providing a novel revenue and productivity optimization system that generates computerized suggestions and recommendations for potential increases in revenue, productivity, and/or efficiency of an organization, based on the analysis of user interaction data associated with a "smart bell," or another service request device. Another aspect of an embodiment of the present invention is providing a novel revenue and productivity optimization system that correlates the service request device's user interaction data with certain environmental variables, such as temperature, humidity, ambient noise levels, brightness, and ambient gas levels near or inside the service request device, in order to generate incisive and detailed computerized suggestions and recommendations for revenue and/or productivity increases to an organization.

In addition, another aspect of an embodiment of the present invention is providing a revenue and productivity optimization system that identifies and determines a poorly-behaving service performer that exhibits chronically-problematic responses to service requests by customers or other individuals. Furthermore, another aspect of an embodiment of the present invention is providing a revenue and productivity optimization system that can report the identified, poorly-behaving service performer to a supervising entity or to an operational quality control staff.

Yet another aspect of an embodiment of the present invention is providing a revenue and productivity optimization system that utilizes cloud-computing resources available on the Internet for seamless portability, upgrades, and operation with installed base of environmental sensors, electronic service request devices, and reception devices. Moreover, another aspect of an embodiment of the present invention is providing a method for operating a novel revenue and productivity optimization system that provides computerized recommendations and suggestions for potentially increasing revenue, productivity, and/or efficiency of an organization.

Figure 1:
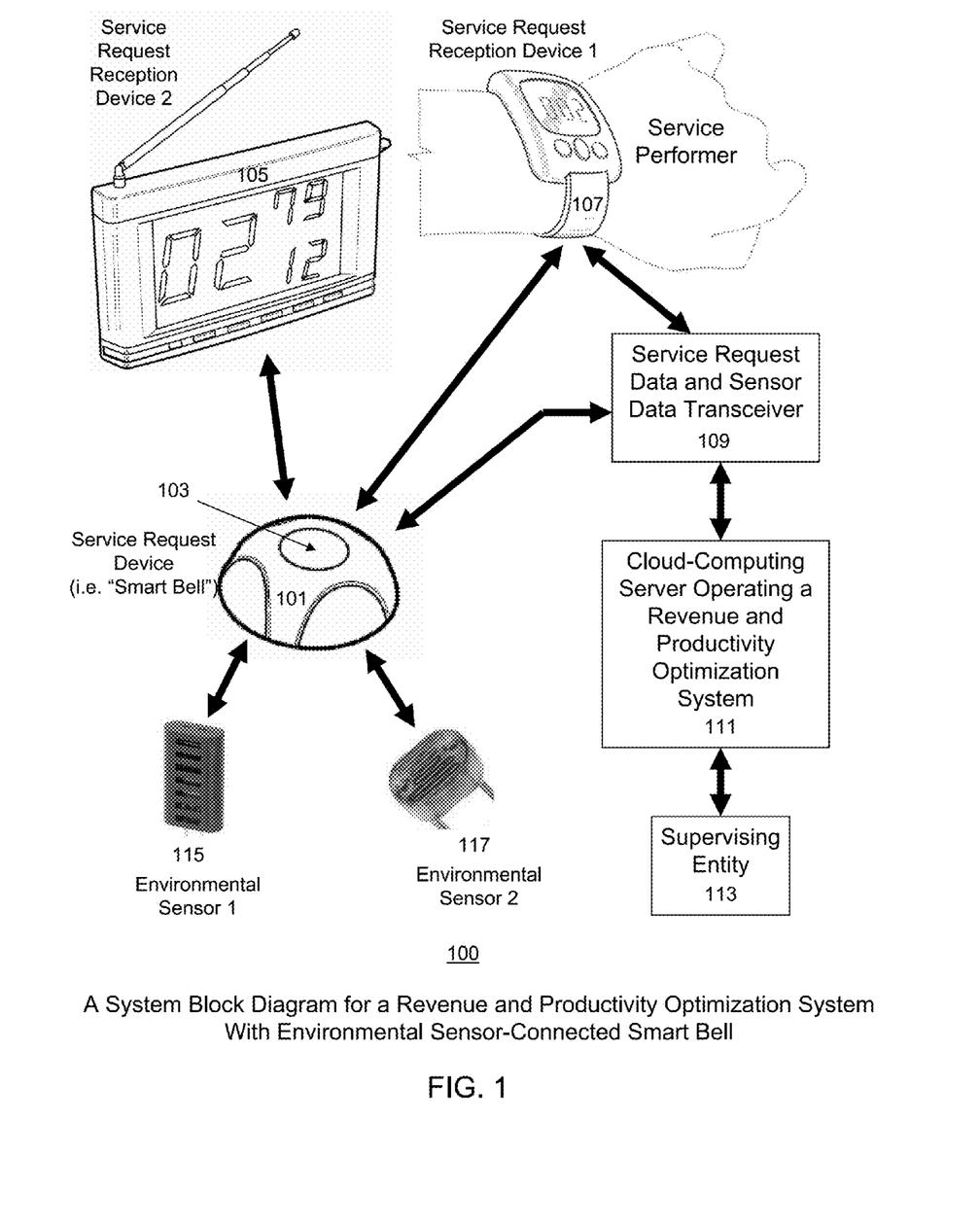
FIG. 1 shows a system block diagram for a revenue and productivity optimization system with an environmental sensor-connected smart bell, in accordance with an embodiment of the invention.

FIG. 1 shows a system block diagram (100) for a revenue and productivity optimization system with an environmental sensor-connected smart bell, in accordance with an embodiment of the invention. In a preferred embodiment of the invention, one or more service request devices (101), also described herein as "smart bells," are part of an electronic network for the revenue and productivity optimization system. Preferably, each service request device (101) includes a bell button (103) that can be depressed by a service requester to trigger transmission of a service request signal to one or more service request reception devices (105, 107) that are within the wireless signal reception range for the revenue and productivity optimization system network.

In one embodiment of the invention, the wireless communication between each service request device (e.g. 101) and each service request reception device (105 or 107) utilizes a 433 MHz center frequency, with transmission and reception range of several hundred meters. In another embodiment of the invention, a different operating frequency is utilized for the wireless communication between each service request device (e.g. 101) and each service request reception device (105 or 107). Yet in another embodiment of the invention, the wireless communication between each service request device (e.g. 101) and each service request reception device (105 or 107) can utilize wireless local area network (LAN) protocols or cellular communication signals for device interoperability and cost efficiency with existing mobile electronic devices, signal repeaters, and routers.

Continuing with FIG. 1, in one embodiment, a service request device (101) with a bell button (103) can transmit a service request signal to a multiple number of service request reception devices (e.g. 105, 107). Preferably, the service request signal is transmitted directly from the service request device (101) to the multiple number of service request reception devices (e.g. 105, 107). In some embodiments of the invention, signal repeaters or wireless routers may be involved in transmission of service request signals. A service performer who is watching a scoreboard-style service request reception device (105), or another service performer who is wearing a watch-style service request reception device (107) can respond to the service request signal, and physically approach a location identified by the service request signal. In the example as shown in FIG. 1, "02" or "002" as displayed in the service request reception devices (e.g. 105, 107) may be a table number at a restaurant, or a particular number associated with a designated location in another business operation. Furthermore, the scoreboard-style service request reception device (105) may also display other service request signals (e.g. "79," "12") that are queued into the scoreboard-style service request reception device (105) after receiving the service request signal for "02" earlier.

As shown in FIG. 1, the revenue and productivity optimization system also incorporates one or more environmental sensors (115, 117), which are able to detect, determine, and/or measure environmental variables, and transmit the associated data to a service request device (e.g. 101), a service request data and sensor data transceiver (109), and/or a cloud-computing server (111) operating the revenue and productivity optimization system. In the system block diagram (100) shown in FIG. 1, the first environmental sensor (115) is a thermometer that measures ambient air temperature, and the second environmental sensor (117) is a photo intensity sensor that measures ambient light intensity or brightness. In other embodiments of the invention, other environmental sensors, such as microphones (i.e. for measuring ambient noise levels), humidity sensors (i.e. for measuring moisture levels), and gas sensors (i.e. for measuring presence of carbon monoxide, carbon dioxide, or oxygen), may be utilized singularly or in combination with other sensors for the revenue and productivity optimization system that also incorporates one or more service request devices (e.g. 101) and service request reception devices (e.g. 105, 107). In one embodiment, the environmental sensors (115, 117) may be located near a service request device, a service request reception device, or the service request data and sensor data transceiver (109). In another embodiment, the environmental sensors (115, 117) may be integrated or encased into a service request device, a service request reception device, or the service request data and sensor data transceiver (109).

In the preferred embodiment of the invention, environmental sensor measurement data from the one or more environmental sensors (115, 117) and service request signals from the service request device (101) are transmitted wirelessly to the cloud-computing server (111) via the service request data and sensor data transceiver (109). By correlating environmental variables, such as ambient temperature, brightness, humidity, noise levels, and/or ambient gas presence near the service request device (101) with the one or more environmental sensors (115, 117), a revenue and productivity optimization analysis module (e.g. 315 of FIG. 3) executed by the cloud-computing server (111) is able to determine whether a specific range of environmental variables is likely to generate more revenue, productivity, and/or efficiency for an organization.

For example, in context of the system block diagram (100) in FIG. 1, if the first environmental sensor (115) currently measures an ambient air temperature of 80 degrees Fahrenheit near the service request device (101) in a restaurant, and the revenue and productivity optimization analysis module executed by the cloud-computing server (111) determines that more bell presses from customers in the restaurant occur when the ambient air temperature is between 70 to 75 degrees Fahrenheit, then the revenue and productivity optimization system may generate a computerized message to a supervising entity (113) to suggest that the ambient air temperature of the restaurant should be lowered to 70 to 75 degrees to maximize customer order requests in the restaurant. In one embodiment of the invention, customer bell press frequencies relative to ambient air temperature in the restaurant may have been observed and recorded in the cloud-computing server (111) by the revenue and productivity optimization system for days, weeks, months, or even years, to determine an optimal range of ambient air temperature that results in a higher number of customer bell press frequencies, compared to a median or average bell press frequencies. In a more sophisticated example, the revenue and productivity optimization system may even be linked to the restaurant's cash register or accounting software to track the actual revenue figures relative to the ambient air temperature.

In another example, in context of the system block diagram (100) in FIG. 1, if the second environmental sensor (117) currently measures the light intensity near the service request device (101) in the restaurant, and the revenue and productivity optimization analysis module executed by the cloud-computing server (111) determines that the current light intensity is too low relative to an optimal light intensity that correlates to a higher number of customer bell press frequencies, then the revenue and productivity optimization system may generate a computerized message to the supervising entity (113) to suggest that the brightness of the restaurant should be improved either by a brighter artificial lighting or by allowing more natural lights through windows to maximize customer order requests in the restaurant. In one embodiment of the invention, customer bell press frequencies relative to lighting conditions in the restaurant may have been observed and recorded in the cloud-computing server (111) by the revenue and productivity optimization system for days, weeks, months, or even years, to determine an optimal range of lighting conditions, which result in a high number of customer bell press frequencies. In a more sophisticated example, the revenue and productivity optimization system may be linked to the restaurant's cash register or accounting software to track the actual revenue figures relative to the lighting conditions near the service request device (101) in the restaurant.

Yet in another example, a plurality of environmental sensors may be utilized simultaneously, thereby allowing the revenue and productivity optimization analysis module executed by the cloud-computing server (111) to consider a multiple number of real-time environmental variables near the service request device (101) for generating revenue and productivity optimization suggestions to the supervising entity (113) of a restaurant, a storefront, a manufacturing facility, or another organization.

In the preferred embodiment of the invention, the software components for the revenue and productivity optimization system are implemented in the cloud-computing computer server (111), which is operatively connected to a data network, such as the Internet, and the service request data and sensor data transceiver (109) for communicating with service request reception devices and service request devices. The service request reception devices and the service request devices may or may not be directly connected to the Internet. By embodying the revenue and productivity optimization system in the cloud computing server (111), in case of the preferred embodiment of the invention as shown in FIG. 1, a convenient level of scalability, portability, and interoperability can be achieved without a cumbersome, labor intensive, and inconvenient on-site local system configuration for implementing the revenue and productivity optimization system. In another embodiment of the invention, the revenue and productivity optimization system may be implemented in a computer server that is not part of the cloud computing resources.

As shown in FIG. 1, the service request data and sensor data transceiver (109) may acquire, demodulate, and process wireless signals among a plurality of service request devices, service request reception devices, and environmental sensors for data analysis by the revenue and productivity optimization system. In some instances, for design simplicity and cost efficiency, a service request device or a service request reception device may integrate, incase, or incorporate one or more environmental sensors, and transmit both of the service request data and the sensor data to the cloud-computing server (111). Furthermore, the revenue and productivity optimization system may also include an analytical and alert threshold determination module (e.g. 313 of FIG. 3) for identifying a chronically-problematic response from a service request reception device. This analytical and alert threshold determination module is configured to track, measure, and analyze various parameters gathered from wireless signal transmissions among the plurality of service request devices and service request reception devices.

For example, the analytical and alert threshold determination module for identifying the chronically-problematic response from the service request reception device may receive, assemble, and analyze a first set of relational data that tracks time elapsed between a first service request bell press from a service request device and a confirmatory signal of successful service fulfillment from a service request reception device. The analytical and alert threshold determination module may also receive, assemble, and analyze a second set of relational data that tracks a number of repeated service request bell presses from the service request device and the confirmatory signal of successful service fulfillment from the service request reception device.

Figure 3:
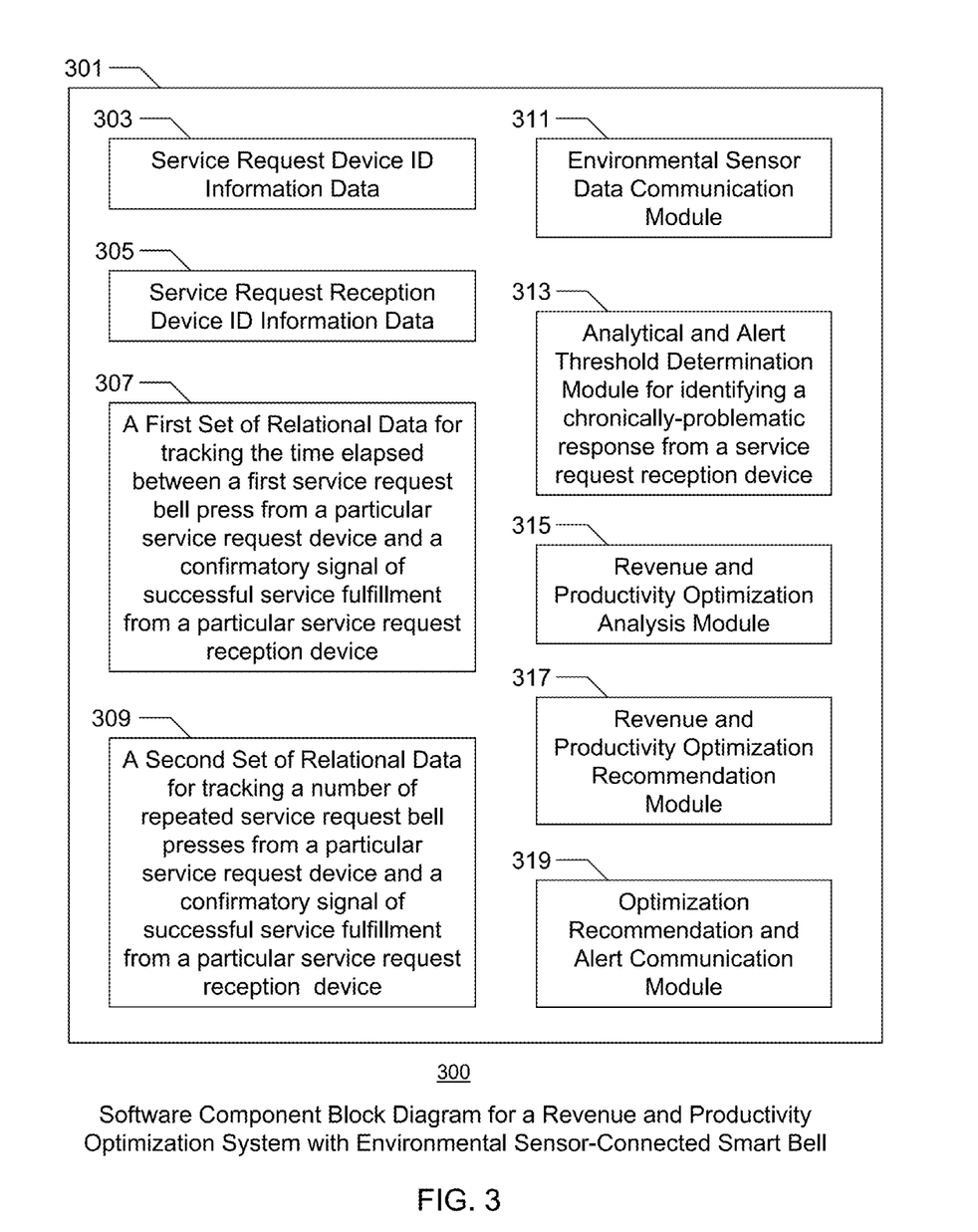
FIG. 3 shows a software component block diagram for a revenue and productivity optimization system with an environmental sensor-connected smart bell, in accordance with an embodiment of the invention.

Continuing with FIG. 1, in a preferred embodiment of the invention, if the first set of relational data and the second set of relational data for a particular service performer are substantially worse than first sets of relational data and second sets of relational data for other performers for a defined period of time (e.g. per day, per week, per month, and etc.), then the analytical and alert threshold determination module may determine that the particular service performer has exhibited "chronically-problematic responses" to service requests, and inform the supervising entity (113) via an email alert, a text alert, or another computerized electronic communication method using an optimization recommendation and alert communication module (e.g. 319 of FIG. 3). Revenue and productivity optimization recommendations and chronically-problematic response alerts generated from the cloud-computing server (111) can both be utilized as an efficiency improvement advisory tool to the supervising entity (113). In one embodiment of the invention, the supervising entity (113) may be an electronic communication device held by a supervisor, a quality control staff member, or another appropriate professional overseeing the general behaviors of service performers in an organization.

Figure 2:
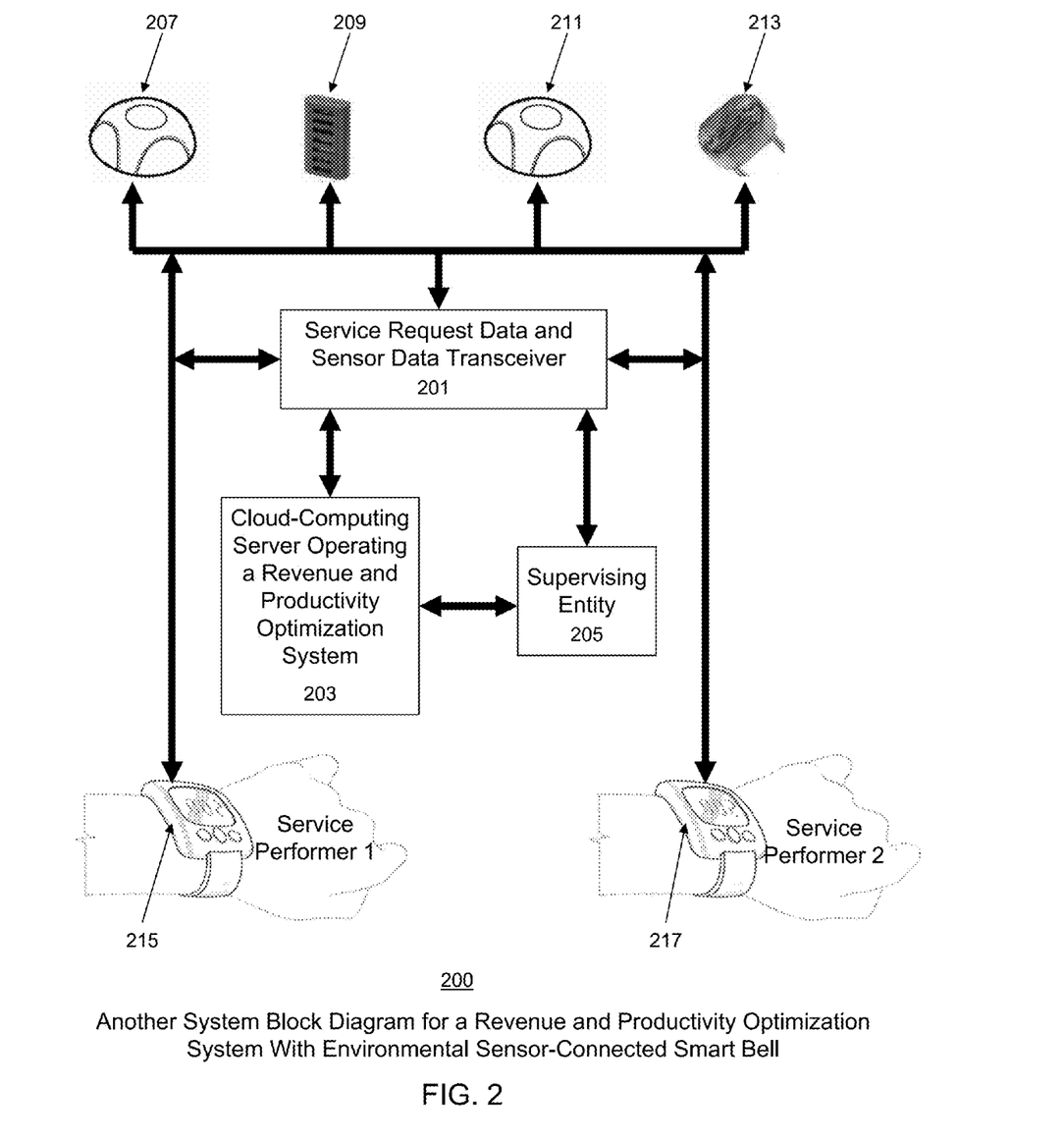
FIG. 2 shows another system block diagram for a revenue and productivity optimization system with an environmental sensor-connected smart bell, in accordance with an embodiment of the invention.

FIG. 2 shows another system block diagram (200) for a revenue and productivity optimization system with an environmental sensor-connected smart bell, in accordance with an embodiment of the invention. In this embodiment of the invention, a plurality of service request devices (207, 211) and a plurality of environmental sensors (209, 213) are part of a revenue and productivity optimization system network. Preferably, each service request device (207, 211) includes a bell button that can be depressed by a service requester to trigger transmission of a service request signal to one or more service request reception devices (215, 217) that are within the wireless signal reception range for the revenue and productivity optimization system network.

In one embodiment of the invention, the wireless communication between each service request device (207 or 211) and each service request reception device (215 or 217) utilizes a 433 MHz center frequency, with transmission and reception range of several hundred meters. In another embodiment of the invention, a different operating frequency is utilized for the wireless communication between each service request device (207 or 211) and each service request reception device (215 or 217). Yet in another embodiment of the invention, the wireless communication between each service request device (207 or 211) and each service request reception device (215 or 217) can utilize wireless local area network (LAN) protocols or cellular communication signals for device interoperability and cost efficiency with existing mobile electronic devices, signal repeaters, and routers. Furthermore, in one embodiment of the invention, the plurality of environmental sensors (209, 213) may be integrated, incased, or incorporated into one or more service request devices (207, 211). In an alternate embodiment of the invention, the plurality of environmental sensors (209, 213) may be located near the one or more service request devices (207, 211), and be operatively connected to the revenue and productivity optimization system network for sensor data communication.

Continuing with FIG. 2, in one embodiment, a service request device (207, 211) with a bell button can transmit a service request signal to a multiple number of service request reception devices (215, 217), and also to a cloud-computing server (203) operating the revenue and productivity optimization system. Similarly, sensor data measured from the plurality of environmental sensors (209, 213) within or near the service request device can be transmitted to the cloud-computing server (203) operating the revenue and productivity optimization system. Preferably, the service request signal and the sensor data are transmitted directly from the service request device (207 or 211) to the cloud-computing server (203) and to the multiple number of service request reception devices (215, 217). In some embodiments of the invention, signal repeaters or wireless routers may be involved in transmission of the service request signals and the sensor data. Both "Service Performer 1" and "Service Performer 2" who wear watch-style service request reception devices (215, 217) can attempt to respond to the service request signal. In one embodiment of the invention, if a multiple number of service performers is available to respond and fulfill a service request, a particular service performer who wishes to respond to the service request signal can seize that opportunity by depressing a functional button on his or her service request reception device (215 or 217) to inform other service performers that the service request is already in the process of being fulfilled. Then, the particular service performer can physically approach a location identified by the service request signal. In the example as shown in FIG. 2, "002" as displayed in the service request reception devices (e.g. 215, 217) may be a table number at a restaurant, or a particular number associated with a designated location in another business operation.

In a preferred embodiment of the invention, environmental sensor measurement data from the plurality of environmental sensors (209, 213) and service request signals from the plurality of service request devices (207, 211) are transmitted wirelessly to the cloud-computing server (203) via a service request data and sensor data transceiver (201).

By correlating environmental variables, such as ambient temperature, brightness, humidity, noise levels, and/or ambient gas presence near the plurality of service request devices (207, 211), a revenue and productivity optimization analysis module (e.g. 315 of FIG. 3) executed by the cloud-computing server (201) is able to determine whether a specific range of environmental variables is likely to generate more revenue, productivity, and/or efficiency for an organization.

For example, in context of the system block diagram (200) in FIG. 2, if the first environmental sensor (209) is a microphone, which currently measures a noise level of 100 decibels near a first service request device (207) in a storefront, and the revenue and productivity optimization analysis module executed by the cloud-computing server (201) determines that more bell presses from customers in the storefront occur when the noise level is less than 70 decibels, then the revenue and productivity optimization system may generate a computerized message to a supervising entity (205) to suggest that the noise level near the first service request device (207) should be lowered to 70 decibels or below to maximize customer order requests in the storefront. In one embodiment of the invention, customer bell press frequencies relative to noise levels in the storefront may have been observed and recorded in the cloud-computing server (203) by the revenue and productivity optimization system for days, weeks, months, or even years, to determine an optimal range or a threshold value of noise levels that results in a higher number of customer bell press frequencies, compared to a median or average bell press frequencies. In a more sophisticated example, the revenue and productivity optimization system may even be linked to the storefront's cash register or accounting software to track the actual revenue figures relative to the noise levels near the first service request device (207).

In another example, in context of the system block diagram (200) in FIG. 2, if the second environmental sensor (213) is a humidity sensor, which currently measures moisture levels near a second service request device (211) in the storefront, and the revenue and productivity optimization analysis module executed by the cloud-computing server (203) determines that the current moisture levels near the second service request device (211) is excessive (e.g. 90 percent) relative to an optimal humidity range (e.g. 20~30 percent) that correlates to a higher number of customer bell press frequencies, then the revenue and productivity optimization system may generate a computerized message to the supervising entity (205) to suggest that the humidity level of the storefront should be lowered to the optimal humidity range by utilizing a dehumidifier or an air conditioner. In one embodiment of the invention, customer bell press frequencies relative to humidity levels in the storefront may have been observed and recorded in the cloud-computing server (203) by the revenue and productivity optimization system for days, weeks, months, or even years, to determine an optimal range of humidity levels that results in a high number of customer bell press frequencies. In a more sophisticated example, the revenue and productivity optimization system may be linked to the storefront's cash register or accounting software to track the actual revenue figures relative to the humidity levels near the second service request device (211) in the storefront.

Yet in another example, a plurality of environmental sensors may be utilized simultaneously, thereby allowing the revenue and productivity optimization analysis module executed by the cloud-computing server (203) to consider a multiple number of real-time environmental variables near the plurality of service request devices (207, 211) for generating revenue and productivity optimization suggestions to the supervising entity (205) of a storefront, a restaurant, a manufacturing facility, or another organization.

In the preferred embodiment of the invention, the software components for the revenue and productivity optimization system are implemented in the cloud-computing computer server (203), which is operatively connected to a data network, such as the Internet, and the service request data and sensor data transceiver (201) for communicating with service request reception devices and service request devices. The service request reception devices and the service request devices may or may not be directly connected to the Internet. By embodying the revenue and productivity optimization system in the cloud computing server (203), in case of the preferred embodiment of the invention as shown in FIG. 2, a convenient level of scalability, portability, and interoperability can be achieved without a cumbersome, labor intensive, and inconvenient on-site local system configuration for implementing the revenue and productivity optimization system. In another embodiment of the invention, the revenue and productivity optimization system may be implemented in a computer server that is not part of the cloud computing resources.

As shown in FIG. 2, the service request data and sensor data transceiver (201) may acquire, demodulate, and process wireless signals among a plurality of service request devices, service request reception devices, and environmental sensors for data analysis by the revenue and productivity optimization system. In some instances, for design simplicity and cost efficiency, a service request device or a service request reception device may integrate, incase, or incorporate one or more environmental sensors, and transmit both of the service request data and the sensor data to the cloud-computing server (203). Furthermore, the revenue and productivity optimization system may also include an analytical and alert threshold determination module (e.g. 313 of FIG. 3) for identifying a chronically-problematic response from a service request reception device. This analytical and alert threshold determination module is configured to track, measure, and analyze various parameters gathered from wireless signal transmissions among the plurality of service request devices and service request reception devices.

For example, the analytical and alert threshold determination module for identifying the chronically-problematic response from the service request reception device may receive, assemble, and analyze a first set of relational data that tracks time elapsed between a first service request bell press from a service request device and a confirmatory signal of successful service fulfillment from a service request reception device. The analytical and alert threshold determination module may also receive, assemble, and analyze a second set of relational data that tracks a number of repeated service request bell presses from the service request device and the confirmatory signal of successful service fulfillment from the service request reception device.

Continuing with FIG. 2, in a preferred embodiment of the invention, if the first set of relational data and the second set of relational data for a particular service performer are substantially worse than first sets of relational data and second sets of relational data for other performers for a defined period of time (e.g. per day, per week, per month, and etc.), then the analytical and alert threshold determination module may determine that the particular service performer has exhibited "chronically-problematic responses" to service requests, and inform the supervising entity (205) via an email alert, a text alert, or another computerized electronic communication method using an optimization recommendation and alert communication module (e.g. 319 of FIG. 3). Revenue and productivity optimization recommendations and chronically-problematic response alerts generated from the cloud-computing server (203) can both be utilized as an efficiency improvement advisory tool to the supervising entity (205). In one embodiment of the invention, the supervising entity (205) may be an electronic communication device held by a supervisor, a quality control staff member, or another appropriate professional overseeing the general behaviors of service performers in an organization.

Figure 4:
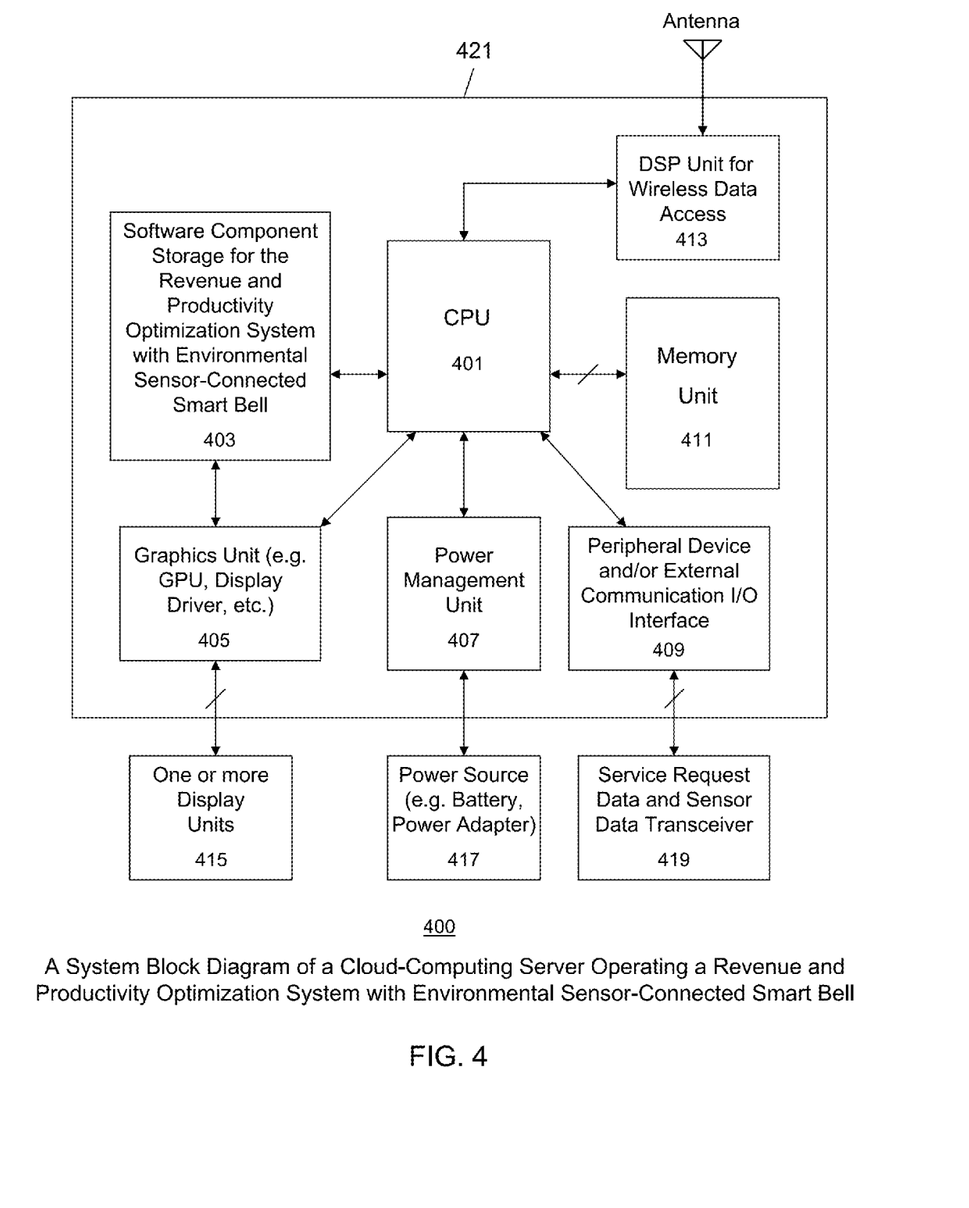
FIG. 4 shows a system block diagram of a cloud-computing server operating a revenue and productivity optimization system with an environmental sensor-connected smart bell, in accordance with an embodiment of the invention.

FIG. 3 shows a software component block diagram (300) for a revenue and productivity optimization system with an environmental sensor-connected smart bell, in accordance with an embodiment of the invention. In a preferred embodiment of the invention, software components (301) of the revenue and productivity optimization system are configured to be stored in a data storage (e.g. 403 of FIG. 4) associated with a computer server, and are also configured to be uploaded to and executed in a memory unit and a CPU of the computer server, as also illustrated in FIG. 4.

Furthermore, in the preferred embodiment of the invention, the software components (301) of the revenue and productivity optimization system comprise an environmental sensor data communication module (311), a revenue and productivity optimization analysis module (315), and a revenue and productivity optimization recommendation module (317). The environmental sensor data communication module (311) is configured to receive sensor data from one or more environmental sensors located near or inside service request devices of an organization, such as a restaurant, a storefront, or a manufacturing facility. After the sensor data are received by the environmental sensor data communication module (311), the revenue and productivity optimization analysis module (315) compares the environmental sensor data against past records of sensor data of the organization that resulted in a higher revenue, efficiency, and/or productivity relative to environmental variables measured by the one or more environmental sensors. In one embodiment of the invention, the correlation of the higher revenue, efficiency, and/or productivity relative to the past records of sensor data may be indirectly deduced by analyzing bell pressing frequencies or intervals from the service request devices relative to the environmental variables measured by the one or more environmental sensors. In another embodiment of the invention, the correlation of the higher revenue, efficiency, and/or productivity relative to the past records of sensor data may be directly linked to actual revenue figures generated by a networked cash register or an accounting software utilized by the organization.

Based on the relational analysis of the higher revenue, efficiency, and/or productivity relative to the past records of sensor data, the revenue and productivity optimization analysis module (315) is able to determine an optimal range or an optimal threshold for environmental variables, which is likely to induce higher revenue, productivity, and/or efficiency for the organization. For example, the revenue and productivity optimization analysis module (315) may determine that an ideal range of carbon dioxide level near a service request device is below 5 percent, if the organization desires to improve sales revenue or productivity. If a gas sensor inside the service request device is reading a current carbon dioxide level of 20 percent, the revenue and productivity optimization analysis module (315) and the revenue and productivity optimization recommendation module (317) may generate a computerized recommendation, which can be transmitted to a supervising entity via an optimization recommendation and alert communication module (319), in order to lower ambient carbon dioxide level near the service request device.

The software components (301) further comprises an analytical and alert threshold determination module (313) for identifying a chronically-problematic response from a service request reception device, and the optimization recommendation and alert communication module (319), which is configured to transmit computer-generated alerts, messages, and other information to the supervising entity. The software components (301) further include service request device identification (ID) information data (303), service request reception device identification (ID) information data (305), and a first set of relational data (307) for tracking the time elapsed between a first service request bell press from a particular service request device and a confirmatory signal of successful service fulfillment from a particular service request reception device or the particular service request device. The software components (301) can also include a second set of relational data (309) for tracking a number of repeated service request bell presses from a particular service request device and a confirmatory signal of successful service fulfillment from a particular service request reception device. In some embodiments of the invention, the second set of relational data (309) also tracks time interval (s) between each of the repeated service request bell presses, because an increasing frequency of repeated bell presses can suggest a service requester's growing dissatisfaction with a service performer's response time.

For example, if a customer presses a service request bell from a particular service request device for the first time, waits three more minutes subsequently before a second bell press, waits an additional two minutes subsequently before a third bell press, and waits one more minute subsequently before a fourth bell press because a service performer still has not shown up at all, then the increasing frequency of repeated bell presses (i.e. a reduced time interval between bell presses) prior to an appropriate response from the service performer may suggest that the service performer is exhibiting a significant behavioral problem in responding to the service request bell. Therefore, if the reduced time interval between bell presses becomes persistent for the service performer due to his or her slow or unacceptable response time to numerous service requests, then this reduced time interval parameter tracked by the second set of relational data (309) may be utilized as a primary factor for determining whether the service performer exhibits chronically-problematic responses that are worthy of generating an alert to a supervising entity or not.

In some embodiments of the invention, the decreasing time interval between each of the repeated service request bell presses and the number of repeated service request bell presses, which are tracked by the second set of relational data (309), may be the primary factors for determining an alert threshold level for chronically-problematic response alerts, which may improve revenue, efficiency, and/or productivity of an organization. For example, an alert threshold level for a plurality of service performers may be set as three separate instances of at least four repeated bell presses per instance, with significant decreases in time intervals between the bell presses in each instance. Preferably, this data tracking may be reset per service performer over a certain period of time (e.g. daily, weekly, monthly, and etc.). In another embodiment of the invention, one or more combinations of data parameters in the first set of relational data (307) and the second set of relational data (309) can be utilized using various statistical methods for computing and determining an alert threshold level. Furthermore, in one embodiment of the invention, a "normal" or "target" response profile may be created for one or more service performers and their associated service request reception devices, so that any service performers who statistically deviate from the "normal" or "target" response profile for a persistent period of time in multiple instances are flagged as problematic for alert determination.

In the preferred embodiment of the invention, the analytical and alert threshold determination module (313) is executed on the CPU and the memory unit of a computer server. The analytical and alert threshold determination module (313) is capable of identifying and determining one or more "chronically-problematic responses" by analyzing the first set of relational data (307) and/or the second set of relational data (309) that characterize a service performer's behavior associated with the service performer's service request reception device. Furthermore, the optimization recommendation and alert communication module (319) is also executed on the CPU and the memory unit of the computer server that implements the revenue and productivity optimization system. In the preferred embodiment of the invention, the optimization recommendation and alert communication module (319) is capable of generating and transmitting an alert to a supervising entity, if the analytical and alert threshold determination module (313) successfully identifies and determines one or more chronically-problematic responses associated with the service performer's service request reception device to exceed an alert threshold level.

In one embodiment of the invention, the alert threshold level is manually adjustable by a supervising entity or another authorized user who utilizes a computerized user interface to set a particular alert threshold level. For example, an alert threshold level can be set by the supervising entity as "high sensitivity," "medium sensitivity," or "low sensitivity," which in turn adjusts what the analytical and alert threshold determination module (313) determines as a chronically-problematic response for a particular service performer's behavior. Setting the alert threshold level to "high sensitivity" can decrease the trigger tolerance of the alert threshold level for the measured time for the first set of relational data (307) and the measured number of repeated service request bell presses for the second set of relational data (309), so that even a small amount of deviation from a "normal" or average statistical profiles can trigger the alert to the supervising entity. Similarly, setting the alert threshold level to "low sensitivity" can increase the trigger tolerance of the alert threshold level for the measured time for the first set of relational data (307) and the measured number of repeated service request bell presses for the second set of relational data (309), so that small amounts of deviation from a "normal" or average statistical profiles do not trigger the alert to the supervising entity.

Furthermore, in one embodiment of the invention, the supervising entity can configure or set a desirable target response time as an alert threshold level for service performers, so that some service performers who are taking more time than the desirable target response time can be flagged or marked as "problematic" at least once. In this embodiment, if a particular service performer repeatedly exceeds the desirable target response time, the analytical and alert threshold determination module (313) may determine that the particular service performer is exhibiting a "chronically-problematic response" and alert the supervising entity accordingly.

Continuing with FIG. 3, in the preferred embodiment of the invention, the first set of relational data (307) and the second set of relational data (309) are gathered, categorized, and stored over a defined period of time (e.g. daily, weekly, monthly, and etc.) via wireless data communication with a plurality of service request devices and service request reception devices in a business operation. Relational data sets can be established and updated by associating a particular service request device ID from the service request device ID information data (303) with a particular service request reception device ID from the service request reception device ID information data (305) and an additional piece of analytically-useful information, such as the time elapsed from the first service request bell press, as described in association with the first set of relational data (307), and the number of repeated service request bell presses, as described in association with the second set of relational data (309).

In one embodiment of the invention, the analytical and alert threshold determination module (313) that identifies and determines the chronically-problematic responses compares the first set of relational data (307) and/or the second set of relational data (309) for a particular service performer against averaged values derived from other service performers. In another embodiment of the invention, the analytical and alert threshold determination module (313) utilizes another suitable statistical method to identify and determine the chronically-problematic responses from a particular service performer.

FIG. 4 shows a system block diagram (400) of a cloud-computing server (421) operating a revenue and productivity optimization system with an environmental sensor-connected smart bell, in accordance with an embodiment of the invention. In a preferred embodiment of the invention, the revenue and productivity optimization system implemented in the cloud-computing server (421) is capable of analyzing environmental variables measured by one or more environmental sensors relative to service request frequencies and intervals from service request devices, in order to generate a computerized recommendation for potential increases in revenue and productivity of an organization. The revenue and productivity optimization system is also capable of identifying, determining, and reporting chronically-problematic responses for service request and fulfillments between a service requester and a service performer.

In the preferred embodiment of the invention, the revenue and productivity optimization system comprises a CPU (401) and a memory unit (411), which are configured to execute and process a plurality of computerized instructions and data. Furthermore, the revenue and productivity optimization system includes a first set of relational data that tracks time elapsed between a first service request bell press from a service request device and a confirmatory signal of successful service fulfillment from a service request reception device. The revenue and productivity optimization system also includes a second set of relational data that tracks a number of repeated service request bell presses from the service request device and the confirmatory signal of successful service fulfillment from the service request reception device. Furthermore, the revenue and productivity optimization system also includes environmental sensor data originating from one or more environmental sensors, which are located near or inside the service request device. Examples of the environmental sensor data include, but are not limited to, ambient air temperature, humidity levels, brightness levels, noise levels, and gas composition levels in the air.

Preferably, the first set and the second set of relational data and the environmental sensor data are gathered and stored in a data storage unit (403), which is operatively connected to the CPU (401) and the memory unit (411) to upload any portion of the first set of relational data, the second set of relational data, and the environmental sensor data based on data uploading instructions from an analytical and alert threshold determination module (e.g. 313 in FIG. 3), a revenue and productivity optimization analysis module (e.g. 315 in FIG. 3), and/or a revenue and productivity optimization recommendation module (e.g. 317 in FIG. 3). In the preferred embodiment of the invention, these modules are also uploaded from the data storage unit (403) to the memory unit (411), and then executed in the CPU (401). The analytical and alert threshold determination module is capable of identifying and determining chronically-problematic responses by analyzing the first set and/or the second set of relational data that characterize a particular service performer's behavior associated with the service performer's service request reception device.

Furthermore, the revenue and productivity optimization analysis module is capable of analyzing environmental variables measured by one or more environmental sensors relative to service request frequencies and intervals from service request devices, in order to determine an optimal range or an optimal threshold for certain environmental variables for increasing revenue and/or productivity. Moreover, the revenue and productivity optimization recommendation module is capable of generating automated textual, aural, email, and/or multimedia messages to a supervising entity as computerized recommendations for potential increases in revenue and productivity of an organization.

Continuing with FIG. 4, in the preferred embodiment of the invention, the revenue and productivity optimization system also includes a graphics unit (405) (e.g. a graphics processor, a display driver, and etc.), a power management unit (407), a peripheral device and/or external communication I/O interface (409), and a digital signal processing (DSP) unit for wireless data access (413). These logical units may be placed on a single printed circuit board in one embodiment of the invention, or on a plurality of printed circuit boards in another embodiment of the invention.

Furthermore, in the preferred embodiment of the invention, the CPU (401) is configured to control each logical unit operatively (i.e. directly or indirectly) connected to the CPU (401). The memory unit (411) typically comprises volatile memory banks based on DRAM's. In some embodiments of the invention, the memory unit (411) may use non-volatile memory technologies such as SRAM's and/or Flash memory. The memory unit (411) is capable of storing or uploading programs and applications which can be executed by the CPU (401), the graphics unit (405), or another logical unit operatively connected to the memory unit (411). In particular, in the preferred embodiment of the invention, software components such as the analytical and alert threshold determination module (e.g. 313 of FIG. 3), the revenue and productivity optimization analysis module (e.g. 315 of FIG. 3), the revenue and productivity optimization recommendation module (e.g. 317 of FIG. 3), and the optimization recommendation and alert communication module (e.g. 319 of FIG. 3), and/or other software components, which are stored in the data storage unit (403), are executed on the CPU (401) and the memory unit (411) of the revenue and productivity optimization system as needed.

In addition, as shown in FIG. 4, the digital signal processing (DSP) unit (413) for wireless data access is operatively connected to an radio frequency (RF) antenna. The digital signal processing (DSP) unit (413) for wireless data access is generally configured to receive and transmit data packets for information associated with service request devices, service request reception devices, and environmental sensors. The DSP unit (413) can also communicate with other devices or other cloud-computing resources in a local area network and the Internet. Moreover, the power management unit (407) is operatively connected to a power supply unit and a power source (e.g. battery, power adapter) (417), and the power management unit (407) generally controls power supplied to various logical units in the cloud computing server (421). Furthermore, the peripheral device and/or external communication I/O interface (409), as shown in FIG. 4, can be operatively connected to a plurality of service request devices, service request reception devices, environmental sensors, peripheral devices to the cloud computing server (421), and other electronic devices through a service request data and sensor data transceiver (419).

Continuing with FIG. 4, in the preferred embodiment of the invention, the graphics unit (405) in the system block diagram (400) for the cloud computing server (421) comprises a graphics processor, a display driver, a dedicated graphics memory unit, and/or another graphics-related logical components. In general, the graphics unit (405) is able to process and communicate graphics-related data with the CPU (401), the display driver, and/or the dedicated graphics memory unit. The graphics unit (405) is also operatively connected to one or more display units (415).

Figure 5:
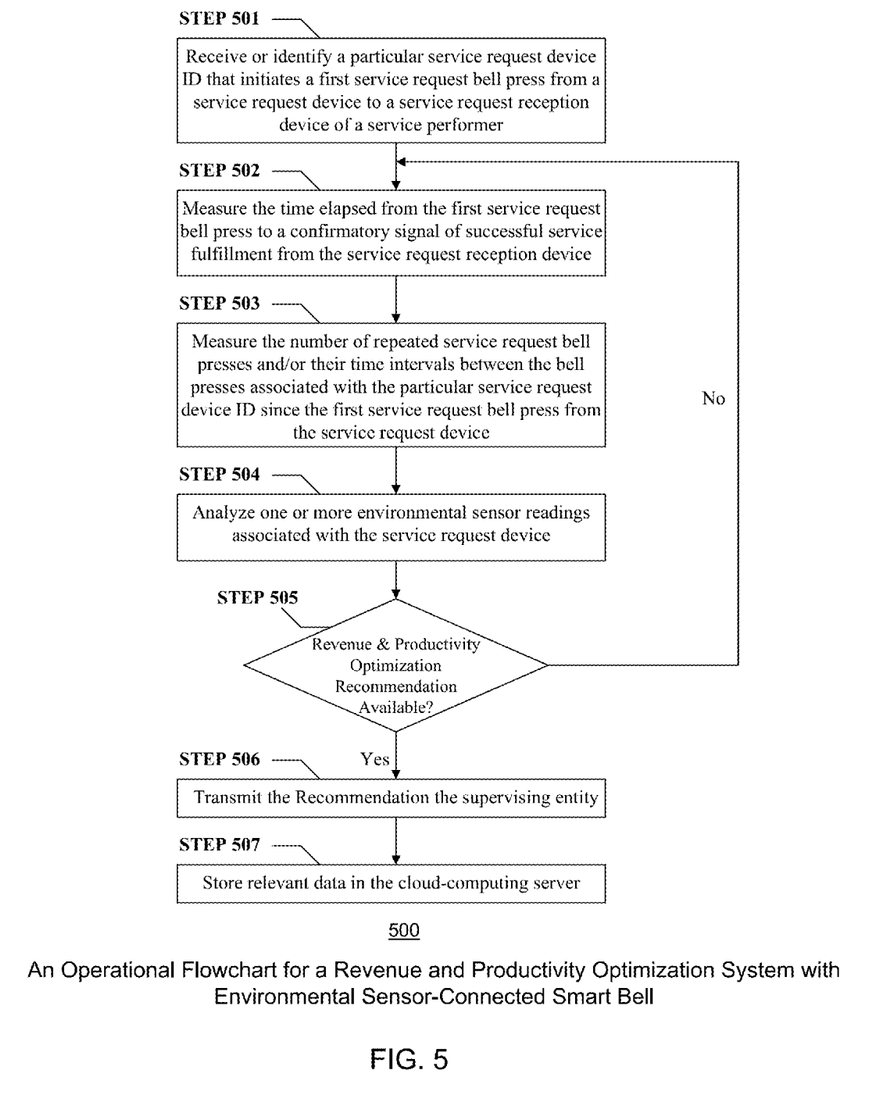
FIG. 5 shows an operational flowchart for a revenue and productivity optimization system with an environmental sensor-connected smart bell, in accordance with an embodiment of the invention.

FIG. 5 shows an operational flowchart (500) for a revenue and productivity optimization system with an environmental sensor-connected smart bell, in accordance with an embodiment of the invention. In the embodiment of the invention as shown in the operational flowchart (500) of FIG. 5, the revenue and productivity optimization system first receives or identifies a particular service request device ID that initiates a first service request bell press from a service request device to a service request reception device belonging to a service performer in a business operation, as shown in STEP 501. Preferably, the information received or identified by the revenue and productivity optimization system can be wirelessly transmitted from one or more service request devices to a DSP unit (e.g. 413 of FIG. 4), an external communication I/O interface (e.g. 409 of FIG. 4), and/or a service request data and sensor data transceiver (e.g. 419 of FIG. 4). Then, in one embodiment of the invention, an analytical and alert threshold determination module and an optimization recommendation and alert communication module are executed on a CPU and a memory unit of the revenue and productivity optimization system.

Subsequently, as shown in STEP 502, the analytical and alert threshold determination module for the revenue and productivity optimization system measures the time elapsed from the first service request bell press to a confirmatory signal of successful fulfillment from the service request reception device, and updates a first set of relational data (e.g. 307 of FIG. 3). In addition, the analytical and alert threshold determination module for the revenue and productivity optimization system also measures the number of repeated service request bell presses associated with the particular service request device ID since the first service request bell press from the service request device, and then updates a second set of relational data (e.g. 309 of FIG. 3), as shown in STEP 503. Optionally, the time intervals between each service request bell press can also be measured and tracked by the analytical and alert threshold determination module and the second set of relational data (e.g. 309 of FIG. 3), as explained previously.

Continuing with FIG. 5, as shown in STEP 504, a revenue and productivity optimization analysis module (e.g. 315 of FIG. 3) in the revenue and productivity optimization system analyzes one or more environmental sensor readings associated with the service request device. If the revenue and productivity optimization analysis module determines a computerized suggestion for improving revenue, productivity, and/or efficiency is appropriate, a revenue and productivity optimization recommendation module (e.g. 317 of FIG. 3) can generate automated textual, aural, email, and/or multimedia messages to a supervising entity as computerized recommendations for potential increases in revenue and productivity of an organization, as shown in STEP 505. Then, an optimization recommendation and alert communication module (e.g. 319 of FIG. 3) can transmit the automated textual, aural, email, and/or multimedia messages or alerts to the supervising entity, as shown in STEP 506. Finally, any relevant data utilized in the data analysis and the recommendation and alert generation may be stored in a data storage of a computer server that implements the revenue and productivity optimization system, as shown in STEP 507. If the revenue and productivity optimization recommendation is not available, then the revenue and productivity optimization system can loop back to STEP 502 until appropriate recommendations and/or alerts become available to the supervising entity, as shown in STEP 502 through STEP 505 in FIG. 5.

Figure 6:
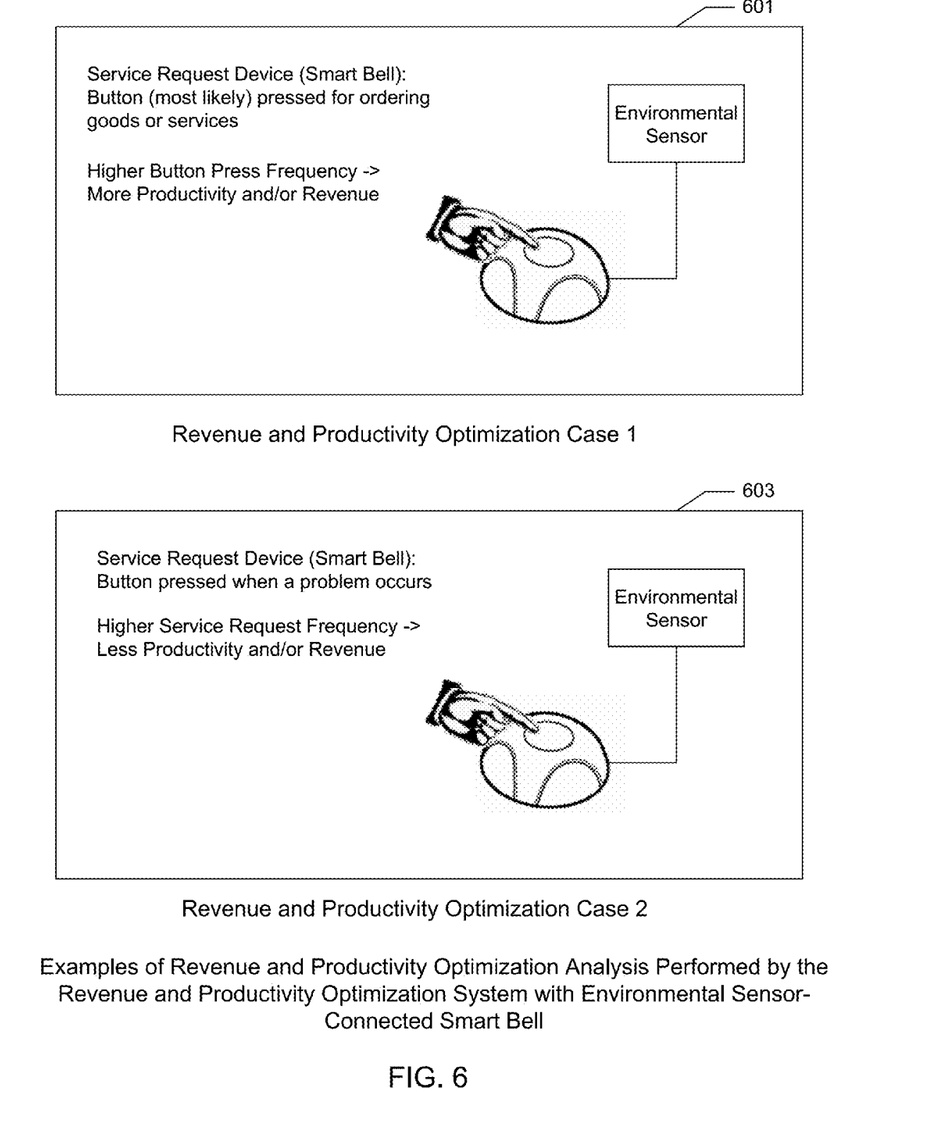
FIG. 6 shows examples of revenue and productivity optimization analysis performed by a revenue and productivity optimization system with an environmental sensor-connected smart bell, in accordance with an embodiment of the invention.

FIG. 6 shows two examples (601, 603) of revenue and productivity optimization analysis performed by a revenue and productivity optimization system with an environmental sensor-connected smart bell, in accordance with an embodiment of the invention. In the first example (601), a button on a service request device (i.e. also called a "smart bell") is pressed by a customer when the customer is requesting goods or services from a restaurant, a storefront, a manufacturing assembly line, or another business operation. Therefore, in the first example (601), a higher button press frequency generally suggests more sales revenue or more productivity for that business operation, because the customer's frequency of requesting more goods or services from the business operation directly varies with the frequency of the higher button press frequency. Thus, an environmental sensor that measures one or more environmental variables during an operation of the service request device can enable the revenue and productivity optimization system to determine a potential influence of those environmental variables on the button press frequency of the service request device, which in turn results in potentially higher sales revenue or productivity for the business operation. Logically, the objective of the revenue and productivity optimization analysis by the revenue and productivity optimization system in the first example (601) is to increase the button press frequency of the service request device, as the increased button press frequency positively correlates with the potentially higher sales revenue or productivity for the business operation.

On the contrary, in the second example (603), a button on a service request device (i.e. also called a "smart bell") is pressed by a worker when the worker is requesting assistance or troubleshoot from a manufacturing assembly line or another business operation. Therefore, in the second example (603), a higher button press frequency generally suggests more problems or troubles in the operation of the manufacturing assembly line or another business operation, as each button press is a worker request for troubleshoot, rather than for a customer order of goods and services. In the second example (603), sales revenue, productivity, and/or efficiency inversely vary with the higher button press frequency from the service request device. Thus, an environmental sensor that measures one or more environmental variables during an operation of the service request device can enable the revenue and productivity optimization system to determine a potential influence of those environmental variables on the button press frequency of the service request device, with an objective of reducing the button press frequencies by deducing optimal ranges or thresholds for the environmental variables that likely decrease the button press frequencies. Logically, the objective of the revenue and productivity optimization analysis by the revenue and productivity optimization system in the second example (603) is to decrease the button press frequency of the service request device, as the button press frequency inversely correlates with the potentially higher sales revenue or productivity for the business operation.

Various embodiments of the present invention provide several key advantages to operational management of business organizations. One advantage of an embodiment of the present invention is providing a novel revenue and productivity optimization system that generates computerized suggestions and recommendations for potential increases in revenue, productivity, and/or efficiency of an organization, based on the analysis of user interaction data associated with a "smart bell," or another service request device.

Another advantage of an embodiment of the present invention is providing a novel revenue and productivity optimization system that uniquely correlates the service request device's user interaction data with certain environmental variables, such as temperature, humidity, ambient noise levels, brightness, and ambient gas levels near or inside the service request device, in order to generate incisive and detailed computerized suggestions and recommendations for revenue and/or productivity increases to an organization.

In addition, another advantage of an embodiment of the present invention is providing a revenue and productivity optimization system that identifies, determines, and alerts a poorly-behaving service performer who exhibits chronically-problematic responses to service requests by customers or other individuals, in order to improve revenue and/or productivity of an organization.

Yet another advantage of an embodiment of the present invention is providing a revenue and productivity optimization system that utilizes cloud-computing resources available on the Internet for seamless portability, upgrades, and operation with installed base of environmental sensors, electronic service request devices, and reception devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A revenue and productivity optimization system comprising:
   a service request device with a bell button that generates service request data and prompts a service performer to approach the service request device when the bell button is pressed, wherein the service request device is connected to a service request data and sensor data transceiver unit for transmission of the service request data and sensor data to a computer server;

an environmental sensor that measures ambient temperature, humidity, noise levels, brightness, or ambient gas compositions near the service request device and generate the sensor data, wherein the environmental sensor is connected to or incorporated in the service request device;

a service request reception device that alerts the service performer when the bell button is pressed from the service request device;

the computer server with a CPU and a memory unit connected to the service request data and sensor data transceiver unit, which is connected to the service request device and the service request reception device;

a first set of relational data that tracks time elapsed between a first service request bell press from the service request device and a confirmatory signal of successful service fulfillment from the service request reception device;

a second set of relational data that tracks a number of repeated service request bell presses, a time interval between each of the repeated service request bell presses from the service request device, and the confirmatory signal of successful service fulfillment from the service request reception device;

a revenue and productivity optimization analysis module executed on the CPU and the memory unit of the computer server, wherein the revenue and productivity optimization analysis module determines an optimal range or threshold for an environmental variable for increasing sales revenue or productivity of an organization by correlating the sensor data from the environmental sensor with the first set of relational data and the second set of relational data;

a revenue and productivity optimization recommendation module executed on the CPU and the memory unit of the computer server, wherein the revenue and productivity optimization recommendation module generates computerized recommendations of the optimal range or threshold for the environmental variable based on outputs from the revenue and productivity optimization analysis module; and an optimization recommendation and alert communication module executed on the CPU and the memory unit of the computer server, wherein the optimization recommendation and alert communication module transmits the computerized recommendations of the optimal range or threshold for the environmental variable to a supervising entity.

2. The revenue and productivity optimization system of claim 1, further comprising an analytical and alert threshold determination module executed on the CPU and the memory unit, wherein the analytical and alert threshold determination module identifies and determines chronically-problematic responses by analyzing the first set of relational data and the second set of relational data that characterize the service performer's behavior associated with the service request reception device.

3. The revenue and productivity optimization system of claim 2, wherein the analytical and alert threshold determination module that identifies and determines the chronically-problematic responses compares the first set of relational data and the second set of relational data for the service performer against averaged values derived from other service performers.

4. The revenue and productivity optimization system of claim 1, further comprising a data storage connected to the computer server to store the sensor data, the first set of relational data, and the second set of relational data.

5. The revenue and productivity optimization system of claim 1, wherein the service request data and sensor data transceiver unit is capable of acquiring, demodulating, and processing wireless data signals from the service request device and the service request reception device.

6. The revenue and productivity optimization system of claim 1, further comprising a peripheral device and external communication I/O interface that operatively connects the revenue and productivity optimization system with the service request device, the service request reception device, a modem, an Internet router, or another electronic device for wired or wireless communications.

7. The revenue and productivity optimization system of claim 1, further comprising a digital signal processing (DSP) unit for wireless data access.

8. The revenue and productivity optimization system of claim 1, further comprising a power management unit and an electrical power source.

9. The revenue and productivity optimization system of claim 1, further comprising a graphics unit and one or more display units.

10. The revenue and productivity optimization system of claim 1, wherein the service request device is utilized by a customer, a client, a colleague, or another service requester who is requesting a service to the service performer.

* * * * *